(12) United States Patent
Limberg et al.

(10) Patent No.: US 11,551,129 B2
(45) Date of Patent: Jan. 10, 2023

(54) QUANTUM PLATFORM ROUTING OF A QUANTUM APPLICATION COMPONENT

(71) Applicant: International Business Machines Corporation, Armonk, NY (US)

(72) Inventors: Jared Andrew Limberg, Shaker Heights, OH (US); Frederik Frank Flöther, Schlieren (CH); Vinod A. Valecha, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 622 days.

(21) Appl. No.: 16/588,115

(22) Filed: Sep. 30, 2019

(65) Prior Publication Data
US 2021/0097419 A1    Apr. 1, 2021

(51) Int. Cl.
*G06N 10/00* (2022.01)
*G06N 20/00* (2019.01)

(52) U.S. Cl.
CPC ............. *G06N 10/00* (2019.01); *G06N 20/00* (2019.01)

(58) Field of Classification Search
CPC .............................. G06N 20/00; G06N 10/00
See application file for complete search history.

(56) References Cited

U.S. PATENT DOCUMENTS

| | | | |
|---|---|---|---|
| 9,451,722 B2 | 9/2016 | Alshinnawi et al. | |
| 9,537,953 B1 | 1/2017 | Dadashikelayeh et al. | |
| 10,223,084 B1 | 3/2019 | Dunn | |
| 10,251,302 B2 | 4/2019 | Bachar et al. | |
| 10,275,721 B2 | 4/2019 | Dukatz et al. | |
| 10,334,330 B2 | 6/2019 | Hasani et al. | |
| 11,270,220 B1 * | 3/2022 | Richardson | G06N 10/00 |
| 11,416,228 B2 * | 8/2022 | Chong | G06F 8/443 |
| 2009/0070402 A1 | 3/2009 | Rose et al. | |
| 2011/0126294 A1 * | 5/2011 | Aaron | G06F 21/10 726/26 |

(Continued)

FOREIGN PATENT DOCUMENTS

EP    1898578 A1    12/2008

OTHER PUBLICATIONS

Linke, et al., Experimental comparison of two quantum computing architectures; https://www.pnas.org/content/114/13/3305.short, Mar. 28, 2017, pp. 3305-3310.

(Continued)

*Primary Examiner* — Thaddeus J Plecha
(74) *Attorney, Agent, or Firm* — Amin, Turocy & Watson, LLP

(57) ABSTRACT

Systems, computer-implemented methods, and computer program products to facilitate quantum platform routing of a quantum application component are provided. According to an embodiment, a system can comprise a memory that stores computer executable components and a processor that executes the computer executable components stored in the memory. The computer executable components can comprise a dissection component that identifies one or more components of a quantum application. The computer executable components can further comprise a determination component that selects at least one quantum platform to execute the one or more components of the quantum application based on a defined run criterion.

17 Claims, 10 Drawing Sheets

```
                                                      ┌─ 600
602 ─ Identifying, by a system operatively coupled to a processor, one or more
       components of a quantum application 604 ─ Selecting, by the system, at least one quantum platform to execute the
       one or more components of the quantum application based on a defined
       run criterion
```

(56) References Cited

U.S. PATENT DOCUMENTS

| | | | |
|---|---|---|---|
| 2011/0289507 A1* | 11/2011 | Khan | G06F 9/5094 |
| | | | 718/100 |
| 2015/0237760 A1 | 8/2015 | Jau et al. | |
| 2017/0223094 A1 | 8/2017 | Johnson et al. | |
| 2018/0199470 A1 | 7/2018 | Schmidtke et al. | |
| 2018/0365585 A1* | 12/2018 | Smith | G06F 9/5027 |
| 2018/0375790 A1 | 12/2018 | Dadashikelayeh et al. | |
| 2019/0019103 A1 | 1/2019 | Dadashikelayeh | |
| 2019/0214766 A1 | 7/2019 | Murray | |

OTHER PUBLICATIONS

Anonymous, https://newsroom.accenture.com/news/accenture-awarded-second-us-patent-for-quantum-computing.htm, Last Accessed Sep. 19, 2019, 2 pages.

Pakin, et al, The Problem with Quantum Computers, Jun. 10, 2019, 10 Pages.

McCaskey, et al., A language and hardware independent approach to quantum-classical computing, SoftwareX, Jul. 25, 2018, pp. 245-254.

Mel, et al., The NIST Definition of Cloud Computing, National Institute of Standards and Technology Special Publication 800-145, Sep. 2011, 7 Pages.

Anonymous, https://techcrunch.com/2019/09/18/aliro-comes-out-of-stealth-with-2-7m-to-democratize-quantum-computing-with-developer-tools/, Last accessed Sep. 25, 2019, 10 Pages.

\* cited by examiner

QUANTUM PLATFORM ROUTING OF A QUANTUM APPLICATION COMPONENT

BACKGROUND

The subject disclosure relates to quantum platform routing, and more specifically, to quantum platform routing of a quantum application component.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate quantum platform routing of a quantum application component are described.

According to an embodiment, a system can comprise a memory that stores computer executable components and a processor that executes the computer executable components stored in the memory. The computer executable components can comprise a dissection component that identifies one or more components of a quantum application. The computer executable components can further comprise a determination component that selects at least one quantum platform to execute the one or more components of the quantum application based on a defined run criterion.

According to an embodiment, a computer-implemented method can comprise identifying, by a system operatively coupled to a processor, one or more components of a quantum application. The computer-implemented method can further comprise selecting, by the system, at least one quantum platform to execute the one or more components of the quantum application based on a defined run criterion.

According to an embodiment, a computer program product that can facilitate a quantum platform routing of a quantum application component process is provided. The computer program product can comprise a computer readable storage medium having program instructions embodied therewith, the program instructions can be executable by a processing component to cause the processing component to identify, by the processor, one or more components of a quantum application. The program instructions can also cause the processing component to select, by the processor, at least one quantum platform to execute the one or more components of the quantum application based on a defined run criterion.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Quantum computing has the potential to solve problems that, due to their computational complexity, cannot be solved, either at all or for all practical purposes, on a classical computer. However, quantum computing requires very specialized skills to, for example, route a quantum computing job (e.g., a quantum application comprising one or more components) to a suitable quantum platform (e.g., comprising quantum hardware and/or software) that can execute the quantum computing job based on a certain run criterion or criteria.

Quantum computing processing hardware and software is being designed and developed using numerous methods and techniques. The differences in the design and implementation of quantum hardware and software result in advantages and disadvantages when compared to one another relative to certain applications or calculations. Existing quantum computing job routing technologies route a quantum computing job (e.g., the entire quantum application) to a single quantum computing device and/or they programmatically (e.g., via a machine learning (ML) model) connect different computing systems (e.g., classical computing systems and/or quantum computing systems). A problem with existing technologies is that they do not enable routing of one or more components (e.g., discrete element(s) and/or component(s)) of a quantum application and/or calculation to one or more quantum platforms comprising quantum hardware and/or quantum software best suited and/or most applicable to execute each component(s) based on one or more certain run criteria (e.g., defined run criterion or criteria).

Figure 1:
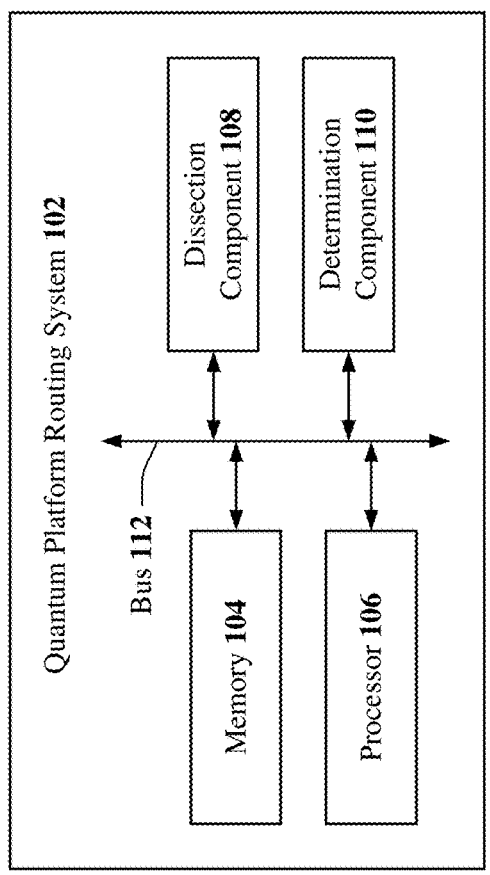
FIG. 1 illustrates a block diagram of an example, non-limiting system that can facilitate quantum platform routing of a quantum application component in accordance with one or more embodiments described herein.

FIG. 1 illustrates a block diagram of an example, non-limiting system 100 that can facilitate quantum platform routing of a quantum application component in accordance with one or more embodiments described herein. System 100 can comprise a quantum platform routing system 102, which can be associated with a cloud computing environment. For example, quantum platform routing system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Quantum platform routing system 102 and/or components thereof (e.g., dissection component 108, determination component 110, evaluation component 202, control component 302, monitor component 402, etc.) can employ one or more computing resources (e.g., quantum hardware, quantum computer, quantum device, etc.) of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by quantum platform routing system 102 and/or components thereof to execute one or more operations in accordance with one or more embodiments of the subject disclosure described herein. For instance, quantum platform routing system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1. Quantum platform routing system 102 can comprise a memory 104, a processor 106, a dissection component 108, a determination component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or quantum platform routing system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum platform routing system 102, dissection component 108, determination component 110, and/or another component associated with quantum platform routing system 102 (e.g., evaluation component 202, control component 302, monitor component 402, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Quantum platform routing system 102, memory 104, processor 106, dissection component 108, determination component 110, and/or another component of quantum platform routing system 102 as described herein can be communicatively, electrically, operatively, and/or optically coupled to one another via a bus 112 to perform functions of system 100, quantum platform routing system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Quantum platform routing system 102 can comprise any type of component, machine, device, facility, apparatus, and/or instrument that comprises a processor and/or can be capable of effective and/or operative communication with a wired and/or wireless network. All such embodiments are envisioned. For example, quantum platform routing system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum platform routing system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, quantum platform routing system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, quantum platform routing system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, quantum platform routing system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between quantum platform routing system 102 and external systems, sources, and/or devices (e.g., computing devices, communication devices, etc.).

Quantum platform routing system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with quantum platform routing system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, dissection component 108, determination component 110, and/or any other components associated with quantum platform routing system 102 as disclosed herein (e.g., communicatively, electronically, operatively, and/or optically coupled with and/or employed by quantum platform routing system 102), can comprise such computer and/or machine readable, writable, and/or executable component(s) and/or instruction(s). Consequently, according to numerous embodiments, quantum platform routing system 102 and/or any components associated therewith as disclosed herein, can employ processor 106 to execute such computer and/or machine readable, writable, and/or executable component(s) and/or instruction(s) to facilitate performance of one or more operations described herein with reference to quantum platform routing system 102 and/or any such components associated therewith.

Quantum platform routing system 102 can facilitate performance of operations executed by and/or associated with dissection component 108, determination component 110, and/or another component associated with quantum platform routing system 102 as disclosed herein (e.g., evaluation component 202, control component 302, monitor component 402, etc.). For example, as described in detail below, quantum platform routing system 102 can facilitate via processor 106 (e.g., a classical processor, a quantum processor, etc.): identifying one or more components of a quantum application; and/or selecting at least one quantum platform to execute the one or more components of the quantum application based on a defined run criterion.

In another example, quantum platform routing system 102 can further facilitate via processor 106 (e.g., a classical processor, a quantum processor, etc.): evaluating one or more defined run criteria of at least one of the one or more components or the at least one quantum platform; managing at least one of execution of the one or more components by the at least one quantum platform or execution data obtained from the at least one quantum platform; reassembling the one or more components into the quantum application based on execution data obtained from the at least one quantum platform; and/or learning to select the at least one quantum platform based on at least one of historical selections of an entity, historical selections of the system, or historical execution results of the at least one quantum platform. In these examples described above: the defined run criterion can comprise one or more defined run criteria of at least one of the one or more components or the at least one quantum platform; the one or more components can comprise at least one of a runtime codebase, a quantum runtime codebase, an algorithm, a quantum algorithm, a quantum circuit, a microwave pulse schedule, a gate, or a gate combination; and/or the at least one quantum platform can comprise at least one of quantum hardware or quantum software.

In some embodiments, the at least one quantum platform described herein can comprise one or more quantum resources (e.g., quantum hardware, quantum software, nodes, functional abstraction layers, etc.) of a cloud computing environment that can facilitate execution of one or more components of a quantum application. For example, the at least one quantum platform can comprise one or more cloud computing nodes 910 of cloud computing environment 950 and/or one or more functional abstraction layers described below with reference to FIGS. 9 and 10, respectively.

Dissection component 108 can identify one or more components of a quantum application. For example, dissection component 108 can identify one or more components (e.g., discrete element(s) and/or component(s)) of a quantum application including, but not limited to, a runtime codebase, a quantum runtime codebase, an algorithm, a quantum algorithm, a quantum circuit, a microwave pulse schedule, a gate, a gate combination, and/or another component of a quantum application.

Dissection component 108 can identify such one or more components defined above of a quantum application including, but not limited to, a quantum program (e.g., a sequence of instructions, collection of quantum circuits, etc.) comprising a high-level programming language (e.g., python, a quantum assembly language (qasm) model, a pulse model, etc.), a quantum computation (e.g., calculation) request comprising such a quantum program, a quantum processing request comprising such a quantum program, and/or another quantum application that can be executed on a quantum platform (e.g., quantum hardware and/or quantum software). In another example, dissection component 108 can identify one or more components of a quantum application and/or data corresponding to such component(s) needed to execute the component(s) on a quantum platform.

To facilitate such identification of one or more components of a quantum application, dissection component 108 can disassemble (e.g., dissect, partition, separate elements of) the quantum application. For example, dissection component 108 can employ a disassembler application (e.g., disassembler software, quantum-based disassembler software, etc.) to disassemble a quantum application into such one or more components defined above. In another example, dissection component 108 can employ an entity (e.g., a programmer, a device, a computer, a robot, a machine, an artificial intelligence driven module, a human, etc.) to disassemble a quantum application and/or identify one or more components thereof.

Determination component 110 can select at least one quantum platform to execute one or more components of a quantum application based on one or more defined run criteria. For example, determination component 110 can select at least one quantum platform comprising quantum hardware and/or quantum software that can execute such one or more components defined above of such a quantum application defined above based on one or more defined run criteria. For instance, determination component 110 can select at least one quantum platform comprising quantum hardware and/or quantum software including, but not limited to, a quantum computing device, a quantum computer, a quantum processor, a quantum annealer, quantum circuit simulation software, a superconducting circuit and/or another type of quantum hardware and/or quantum software that can execute such one or more components defined above of such a quantum application defined above based on one or more defined run criteria.

While each quantum platform can comprise certain (e.g., desirable) qualities such as, for instance, speed, accuracy, noise, etc., determination component 110 can select at least one quantum platform comprising quantum hardware and/or quantum software that can execute one or more components of a quantum application based on one or more defined run criteria related to, for instance: a) feasibility (e.g., whether or not a quantum platform supports one or more certain components of a certain quantum application); and/or b) achieving defined results (e.g., a certain quantum platform may produce results that are more desirable than that of another quantum platform).

Determination component 110 can select at least one quantum platform comprising such quantum hardware and/or quantum software that can execute one or more components of a quantum application based on one or more defined run criteria of the one or more components and/or the at least one quantum platform. For example, determination component 110 can select at least one quantum platform comprising such quantum hardware and/or quantum software that can execute one or more components of a quantum application based on one or more defined run criteria including, but not limited to: a certain gate(s) and/or gate characteristic(s) (e.g., only certain quantum platforms can permit (e.g., execute) such gate(s)); a certain gate combination(s) (e.g., only certain quantum platforms can permit (e.g., execute) such gate combination(s)); a certain measurement type(s) (e.g., only certain quantum platforms can permit (e.g., execute) such measurement(s)); certain algorithm(s) with a predefined set(s) of gates and/or measurement(s) (e.g., to achieve desired results such as, for instance, defined accuracy (e.g., relatively high or low), defined execution speed (e.g., relatively fast or slow), etc.); quantum platform queue times (e.g., relatively short or long amount of time before execution of a quantum job can begin); quantum platform cost (e.g., computational cost—some quantum platforms can cost more or less to run certain transactions); quantum platform gate execution versus (vs.) coherence times (e.g., different quantum platforms can place different constraints on the time of calculation due to the effects of decoherence compared with gate execution times); quantum platform quantum computer type (e.g., quantum annealers vs. circuit-based quantum computers); quantum platform noise characteristics; number of qubits on each quantum platform and how they are interconnected; availability of quantum hardware and/or quantum software of a quantum platform; access to quantum hardware and/or quantum software of a quantum platform (e.g., user rights and/or user privileges enabling access to certain quantum hardware and/or certain quantum software of a quantum platform); workload of quantum hardware and/or quantum software of a quantum platform; fidelity of quantum hardware of a quantum platform (e.g., fidelity of one or more qubits of a quantum device); complexity of the one or more components of the quantum application (e.g., complexity of one or more circuits, gate combinations, pulse schedules, etc.); anticipated execution time corresponding to the quantum application; and/or another defined run criterion.

Determination component 110 can select at least one quantum platform comprising certain quantum hardware and/or certain quantum software that can execute one or more components of a quantum application based on such one or more defined run criteria described above that can be defined and/or weighted by an entity. For example, determination component 110 can select at least one quantum platform based on one or more of such defined run criteria described above that can be defined and/or weighted (e.g., individually weighted using a percentage (%) assigned to each criterion) by an entity (e.g., a programmer, a device, a computer, a robot, a machine, an artificial intelligence driven module, a human, etc.) using an interface component of quantum platform routing system 102 (e.g., an application programming interface (API), a representational state transfer API (REST API), a graphical user interface (GUI), etc.). For instance, such an entity can employ such an interface component to specify execution speed over result accuracy (e.g., via assigning a greater weight to execution speed) and determination component 110 can select at least one quantum platform that can execute one or more components of a quantum application based on such specification.

Based on such specification of one or more defined run criteria described above, determination component 110 can select at least one quantum platform comprising certain quantum hardware and/or certain quantum software best suited and/or most applicable relative to that of other quantum platforms to execute one or more components of a quantum application. For example, determination component 110 can select at least one quantum platform comprising certain quantum hardware and/or certain quantum software best suited and/or most applicable relative to that of other quantum platforms to execute one or more components of a quantum application based on a default configuration comprising a rule based mapping of one or more of such defined run criteria described above to such one or more components.

In an example, the default configuration described above can be defined by an entity (e.g., a programmer, a device, a computer, a robot, a machine, an artificial intelligence driven module, a human, etc.) by specifying such mapping of one or more defined run criteria to one or more components using an interface component of quantum platform routing system 102 as described above. In another example, such a default configuration that can be defined by such an entity can further comprise selection, by the entity, of the at least one quantum platform comprising certain quantum hardware and/or certain quantum software best suited and/or most applicable relative to that of other quantum platforms to execute one or more components of a quantum application based on one or more corresponding defined run criteria that can be defined therein. In some embodiments, such a default configuration can be stored on memory 104 and/or accessed by one or more components of quantum platform routing system 102 to facilitate one or more functions of such components in accordance with one or more embodiments of the subject disclosure described herein.

Determination component 110 can select at least one quantum platform comprising certain quantum hardware and/or certain quantum software best suited and/or most applicable relative to that of other quantum platforms to execute one or more components of a quantum application based on one or more pre-determined libraries comprising rule based mapping(s) of one or more defined run criteria described above to one or more component(s). For example, such one or more pre-determined libraries can be defined by an administrator (e.g., an entity described above) that implements quantum platform routing system 102.

In an example, the one or more pre-determined libraries described above can be defined by an administrator by specifying such mapping(s) of the one or more defined run criteria to one or more components using an interface component of quantum platform routing system 102 as described above. In another example, such one or more pre-determined libraries described above can further comprise selection, by the administrator, of the at least one quantum platform comprising certain quantum hardware and/or certain quantum software best suited and/or most applicable relative to that of other quantum platforms to execute one or more components of a quantum application based on one or more corresponding defined run criteria that can be defined therein. In some embodiments, such one or more pre-determined libraries can be stored on memory 104 and/or accessed by one or more components of quantum platform routing system 102 to facilitate one or more functions of such components in accordance with one or more embodiments of the subject disclosure described herein.

To facilitate such selection by determination component 110 based on one or more defined run criteria as described above, determination component 110 can rank each quantum platform according to one or more ranking schemes that indicate: a) whether or not each quantum platform can support (e.g., can execute) the one or more components of a quantum application; and/or b) whether or not each quantum platform can achieve a defined result. For example, determination component 110 can employ a binary ranking scheme to rank each quantum platform by assigning a value of zero (0) to each quantum platform that can support such component(s) and/or achieve a defined result and a value of one (1) to each quantum platform that cannot. In another example, determination component 110 can employ a weighted ranking scheme that can account for one or more weighted values of one or more defined run criteria that can be assigned by an entity as described above. In these examples, determination component 110 can select at least one of such quantum platforms based on a ranking value corresponding to such quantum platform(s) (e.g., a highest value relative to other quantum platforms, a lowest value relative to other quantum platforms, etc.).

Quantum platform routing system 102 and/or determination component 110 can modify such a default configuration and/or such one or more pre-determined libraries described above. For example, such a default configuration and/or such one or more pre-determined libraries described above can be modified using a programmatic approach (e.g., to facilitate improved selection by determination component 110 over time). For instance, quantum platform routing system 102 and/or determination component 110 can modify such a default configuration and/or such one or more pre-determined libraries described above using a machine learning (ML) model, where determination component 110 can employ such an ML model to learn to select the at least one quantum platform based on historical data including, but not limited to: historical selections of an entity (e.g., historical selections of defined run criteria and/or quantum platform selections made by an entity such as, for instance, an entity defined above); historical selections of determination component 110 (e.g., quantum platform selections made by determination component 110); historical execution results of the at least one quantum platform; and/or other historical data.

To facilitate leaning to select the at least one quantum platform based on such historical data defined above, determination component 110 can employ a machine learning (ML) model based on Artificial Intelligence (AI) and Natural Language Processing (NLP), including, but not limited to, a shallow or deep neural network model, a long short-term memory (LSTM) model, a gated recurrent unit (GRU) model, a convolutional neural network (CNN) model, a support vector machine (SVM) model, a decision tree classifier, or any supervised or unsupervised machine learning model. For example, determination component 110 can employ an ML model defined above (e.g., an LSTM model, a GRU model, a CNN model, an SVM model, etc.) to learn to select the at least one quantum platform based on such historical data, where such learning can be implemented using supervised learning and/or unsupervised learning.

Determination component 110 can employ an ML model defined above (e.g., an LSTM model, a GRU model, a CNN model, an SVM model, etc.) to learn to select the at least one quantum platform based on classifications, correlations, inferences and/or expressions associated with principles of artificial intelligence. For instance, determination component 110 can employ an ML model defined above to learn to select the at least one quantum platform based on such historical data defined above by employing a probabilistic and/or statistical-based analysis (e.g., factoring into the analysis utilities and costs).

Determination component 110 can employ any suitable machine learning based techniques, statistical-based techniques, and/or probabilistic-based techniques to learn to select the at least one quantum platform based on such historical data defined above. For example, determination component 110 can employ an expert system, fuzzy logic, support vector machine (SVM), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model.

Determination component 110 can perform a set of machine learning computations associated with leaning to select the at least one quantum platform based on such historical data defined above. For example, determination component 110 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn to select the at least one quantum platform based on such historical data defined above.

It should be appreciated that such selection by determination component 110 of at least one quantum platform comprising quantum hardware and/or quantum software that can execute one or more components of a quantum application based on one or more defined run criteria as described above can enable one or more certain elements (components) of a quantum application to take advantage of certain quantum hardware and/or quantum software for any number of reasons. It should be further appreciated that such selection by determination component 110 of designated quantum hardware and/or software can be used to achieve: enhanced results (e.g., defined results, desirable results, etc.) in executing one or more components of a quantum application; comparative results (e.g., via execution of a certain component of a quantum application by at least two different quantum platforms to compare the results of such different platforms); and/or to route one or more components to a prioritized quantum device(s) with lower (e.g., shorter) queue time(s).

To facilitate selection of at least one quantum platform comprising certain quantum hardware and/or certain quantum software that can execute one or more certain components of a quantum application based on the one or more defined run criteria described above, determination component 110 can employ an evaluation component to evaluate one or more defined run criteria of the one or more components and/or the at least one quantum platform. For example, to determine which quantum platform(s) comprising certain quantum hardware and/or certain quantum software best suited and/or most applicable to execute one or more certain components of a quantum application, determination component 110 can employ evaluation component 202 to evaluate one or more defined run criteria of the one or more components and/or the at least one quantum platform as described below with reference to FIG. 2.

Figure 2:
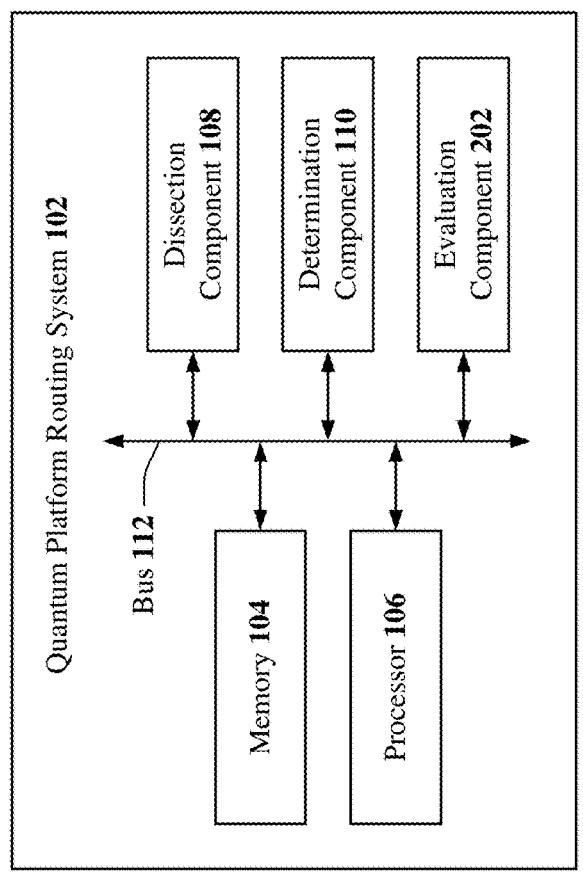
FIG. 2 illustrates a block diagram of an example, non-limiting system that can facilitate quantum platform routing of a quantum application component in accordance with one or more embodiments described herein.

FIG. 2 illustrates a block diagram of an example, non-limiting system 200 that can facilitate quantum platform routing of a quantum application component in accordance with one or more embodiments described herein. System 200 can comprise quantum platform routing system 102. In some embodiments, quantum platform routing system 102 can comprise an evaluation component 202. Repetitive description of like elements and/or processes employed in respective embodiments is omitted for sake of brevity.

Evaluation component 202 can evaluate one or more defined run criteria of one or more components of a quantum application and/or at least one quantum platform. For example, evaluation component 202 can evaluate the one or more components of a quantum application that can be identified by dissection component 108 to determine whether such component(s) have one or more defined run criteria corresponding thereto. In another example, evaluation component 202 can evaluate quantum hardware and/or quantum software of the at least one quantum platform that can be selected by determination component 110 to determine whether such quantum platform(s) have one or more features (e.g., attributes, parameters, etc.) needed to execute such component(s) based on one or more defined run criteria that can correspond to such component(s). In this example, such feature(s) can constitute one or more defined run criteria of the quantum hardware and/or quantum software of the at least one quantum platform, as such feature(s) can be necessary to execute the one or more components based on one or more defined run criteria of such component(s).

Evaluation component 202 can evaluate the one or more components of a quantum application that can be identified by dissection component 108 to determine whether such component(s) have one or more defined run criteria corresponding thereto (e.g., gate type, gate characteristic, circuit topology (e.g., architecture), measurement type, algorithm type, accuracy level, execution speed, queue time, cost, gate execution versus (vs.) coherence time, quantum computer type, noise characteristics, number of qubits and/or qubit interconnection, qubit fidelity, circuit complexity, gate combination complexity, pulse schedule complexity, anticipated execution time, etc.). For example, to facilitate such evaluation of such component(s), evaluation component 202 can analyze the default configuration and/or the one or more pre-determined libraries described above to determine whether they have one or more defined run criteria corresponding to one or more components that can be defined therein.

Evaluation component 202 can evaluate quantum hardware and/or quantum software of the at least one quantum platform that can be selected by determination component 110 to determine whether such quantum platform(s) have one or more features (e.g., attributes, parameters, etc.) needed to execute such component(s) and/or achieve a defined result based on one or more defined run criteria that can correspond to such component(s) (e.g., compatibility (e.g., gate type, gate characteristic, gate combination, measurement type, algorithm type, etc.); capability (e.g., gate execution vs. coherence time, result accuracy, execution duration, cost, etc.); resource type and/or characteristics (e.g., quantum computer and/or software type, noise characteristics, qubit quantity, qubit frequency, qubit interconnection, qubit fidelity, etc.); availability (e.g., queue times, workload, etc.); access (e.g., user rights, user privileges, licensing, etc.); etc.). For example, to facilitate such evaluation of quantum hardware and/or quantum software of a quantum platform, evaluation component 202 can analyze one or more features (e.g., attributes, parameters, etc.) of various quantum resources (e.g., quantum hardware and/or quantum software) including, but not limited to, resource configuration and/or property of a quantum resource, a pulse library of a quantum resource (e.g., a collection of default pulses that can be defined, calibrated, and/or periodically recalibrated to perform one or more certain operations on a certain quantum resource); and/or another feature. In this example, such a configuration and/or property of a quantum resource can comprise information corresponding to the resource including, but not limited to, a specification, a control parameter (e.g., time-step set by control hardware, measurement time, buffer time, etc.), a select parameter (e.g., a return value) corresponding to the quantum resource that provide the pulses the resource supports, time scales the quantum resource supports, data about how pulses of a quantum resource pulse library are arranged, how many channels are allowed by the quantum source, and/or other information.

Figure 3:
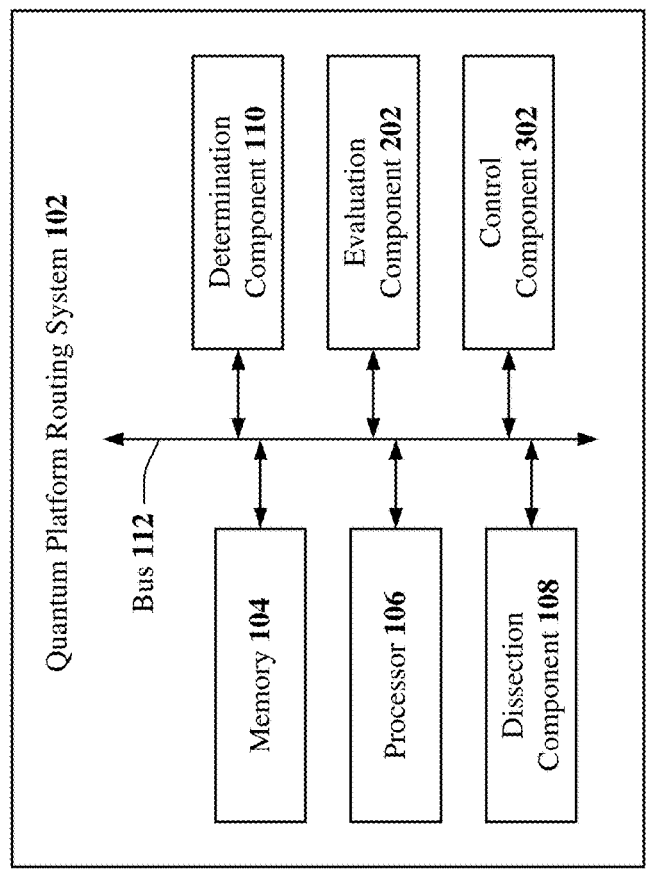
FIG. 3 illustrates a block diagram of an example, non-limiting system that can facilitate quantum platform routing of a quantum application component in accordance with one or more embodiments described herein.

FIG. 3 illustrates a block diagram of an example, non-limiting system 300 that can facilitate quantum platform routing of a quantum application component in accordance with one or more embodiments described herein. System 300 can comprise quantum platform routing system 102. In some embodiments, quantum platform routing system 102 can comprise a control component 302. Repetitive description of like elements and/or processes employed in respective embodiments is omitted for sake of brevity.

Control component 302 can manage execution of one or more components of a quantum application by at least one quantum platform and/or execution data obtained from the at least one quantum platform. For example, control component 302 can manage (e.g., via an API, a REST API, etc.) one or more request and/or response functions associated with execution of the one or more components of the quantum application by the at least one quantum platform. In another example, control component 302 can manage (e.g., via an API, a REST API, etc.) quantum platform queuing associated with the at least one quantum platform.

Based on selection of the at least one quantum platform by determination component 110 as described above, control component 302 can prepare each of the one or more components to be dispatched for execution and/or dispatch each of the one or more components to the at least one quantum platform for execution. For example, control component 302 can individually package and/or dispatch each of the one or more components of the quantum application to the at least one quantum platform for execution. For instance, for each of the one or more components of the quantum application, control component 302 can submit an execution request to the at least one quantum platform (e.g., a scheduling component and/or a queueing component of the at least one quantum platform), where each of such execution request(s) can comprise the one or more components and/or corresponding data necessary to execute such component(s).

Based on such dispatching by control component 302 of one or more components of a quantum application to at least one quantum platform as described above, control component 302 can further manage execution data obtained from the at least one quantum platform. For example, control component 302 can analyze execution results obtained from the at least one quantum platform. In another example, control component 302 can manage (e.g., address, resolve, etc.) responses from the at least one quantum platform (e.g., requests for additional information, execution failure responses, offline responses, etc.).

Control component 302 can reassemble the one or more components into the quantum application based on execution data (e.g., result(s)) obtained from the at least one quantum platform (e.g., via an API, a REST API, etc.). For example, based on execution by the at least one quantum platform of the one or more components of a quantum application, control component 302 can obtain (e.g., receive) a result(s) of such execution(s), analyze such result(s) (e.g., to ensure they comply with one or more defined run criteria), and/or assemble the executed one or more components based on such result(s) (e.g., assemble the executed one or more components with corresponding execution result(s)).

To facilitate such reassembly of the one or more components based on such execution result(s), control component 302 can assemble (e.g., combine) the one or more components back into the quantum application based on such execution result(s) (e.g., via combining the one or more components with corresponding execution results back into the quantum application while ensuring correct code language, syntax, semantics, compatibility, etc.). For example, control component 302 can employ an assembler application (e.g., assembler software, quantum-based assembler software, etc.) to assemble the one or more components back into the quantum application based on such execution result(s). In another example, control component 302 can employ an entity (e.g., a programmer, a device, a computer, a robot, a machine, an artificial intelligence driven module, a human, etc.) to assemble the one or more components back into the quantum application based on such execution result(s).

Figure 4:
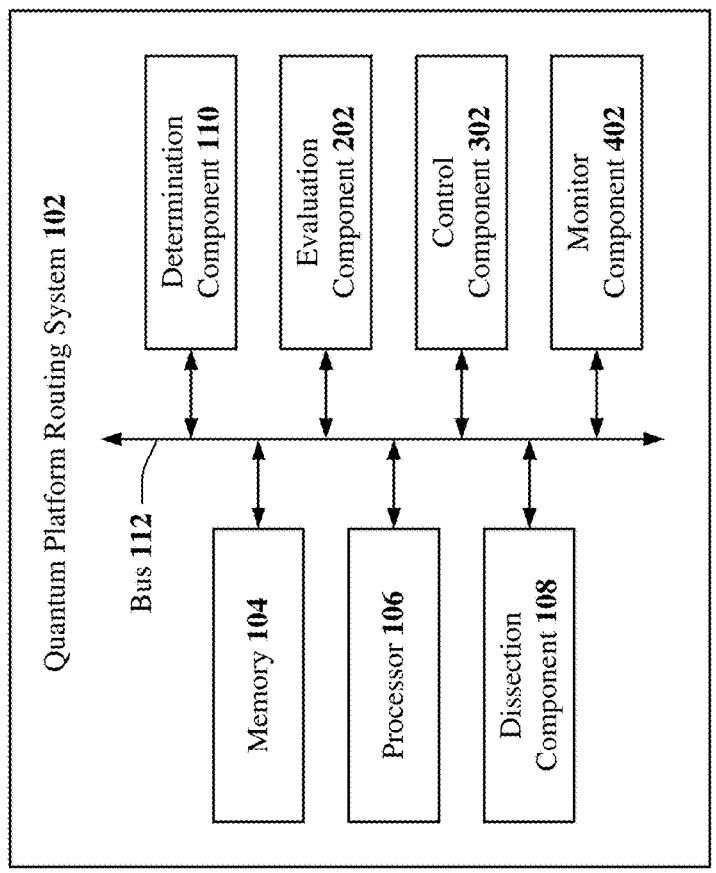
FIG. 4 illustrates a block diagram of an example, non-limiting system that can facilitate quantum platform routing of a quantum application component in accordance with one or more embodiments described herein.

FIG. 4 illustrates a block diagram of an example, non-limiting system 400 that can facilitate quantum platform routing of a quantum application component in accordance with one or more embodiments described herein. System 400 can comprise quantum platform routing system 102. In some embodiments, quantum platform routing system 102 can comprise a monitor component 402. Repetitive description of like elements and/or processes employed in respective embodiments is omitted for sake of brevity.

Monitor component 402 can monitor one or more components of quantum platform routing system 102 to collect (e.g., via read and/or write commands executed by processor 106) historical data that can be used by determination component 110 to learn to select the at least one quantum platform based on such historical data as described above. For example, monitor component 402 can comprise an agent (e.g., a monitoring agent, an application, software script, processing threads, etc.) that can be installed on and/or implemented in conjunction with one or more components of quantum platform routing system 102 to collect such historical data.

Monitor component 402 can be installed on and/or implemented in conjunction with memory 104 to monitor and/or collect historical selections of an entity (e.g., an entity defined above). For example, monitor component 402 can be installed on and/or implemented in conjunction with memory 104 to monitor and/or collect historical selections of defined run criteria and/or quantum platform selections made by an entity based on such defined run criteria. In this example, such an entity can input such selections into the default configuration and/or the one or more pre-determined libraries described above that can be stored on memory 104 and/or accessed by monitor component 402.

Monitor component 402 can be installed on and/or implemented in conjunction with memory 104 and/or determination component 110 to monitor and/or collect historical selections of determination component 110. For example, monitor component 402 can be installed on and/or implemented in conjunction with memory 104 and/or determination component 110 to monitor and/or collect historical quantum platform selections made by determination component 110 based on defined run criteria. In this example, such defined run criteria can be input to the default configuration and/or the one or more pre-determined libraries described above that can be stored on memory 104 and/or accessed by monitor component 402. In another example, such historical quantum platform selections made by determination component 110 based on such defined run criteria can be stored (e.g., by determination component 110) on memory 104 and/or accessed by monitor component 402.

Monitor component 402 can be installed on and/or implemented in conjunction with memory 104, determination component 110, and/or control component 302 to monitor and/or collect historical execution results of the at least one quantum platform. For example, monitor component 402 can be installed on and/or implemented in conjunction with memory 104, determination component 110, and/or control component 302 to monitor and/or collect historical execution results generated by the at least one quantum platform in executing the one or more components of a quantum application. In this example, such historical execution results can be generated by the at least one quantum platform selected by determination component 110 based on defined run criteria. In this example, such defined run criteria can be input to the default configuration and/or the one or more pre-determined libraries described above that can be stored on memory 104 and/or accessed by monitor component 402. In another example, such historical quantum platform selections made by determination component 110 based on such defined run criteria can be stored (e.g., by determination component 110) on memory 104 and/or accessed by monitor component 402. In another example, such historical execution results can be obtained by and/or stored by control component 302 on memory 104 and/or accessed by monitor component 402.

Figure 5:
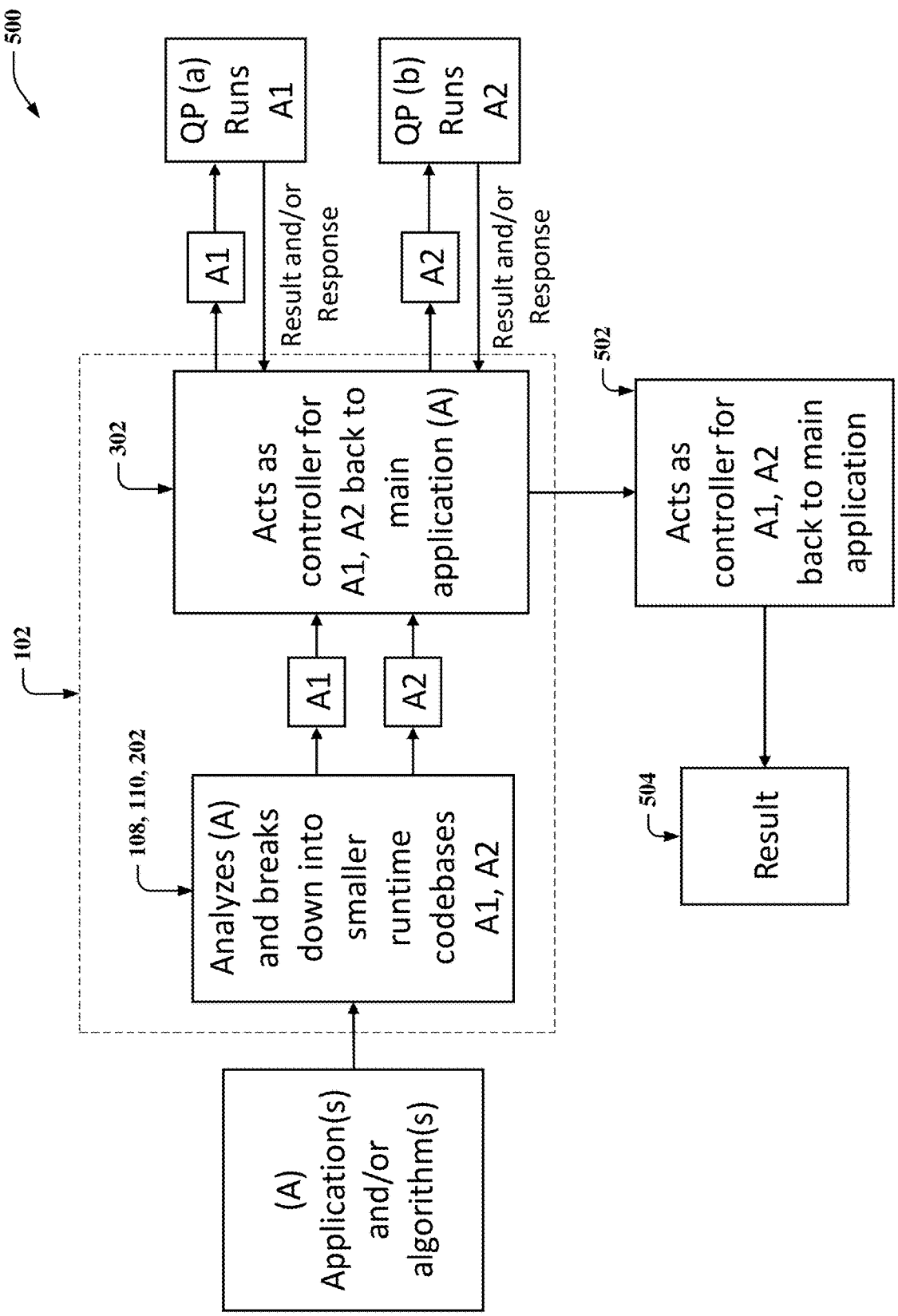
FIG. 5 illustrates a block diagram of an example, non-limiting system that can facilitate quantum platform routing of a quantum application component in accordance with one or more embodiments described herein.

FIG. 5 illustrates a block diagram of an example, non-limiting system 500 that can facilitate quantum platform routing of a quantum application component in accordance with one or more embodiments described herein. Repetitive description of like elements and/or processes employed in respective embodiments is omitted for sake of brevity.

As illustrated by system 500 depicted in FIG. 5, one or more quantum applications (denoted as (A) Application(s) and (A) in FIG. 5) can be input to and/or received by quantum platform routing system 102 (e.g., via an interface component of quantum platform routing system 102 such as, for instance, an API, a REST API, a GUI, etc.).

As described above with reference to FIG. 1 and as illustrated in FIG. 5, dissection component 108 can disassemble quantum application (A) into one or more components such as, for instance, algorithm A1 and/or A2 depicted in FIG. 5 and/or data corresponding to algorithm A1 and/or A2.

As described above with reference to FIG. 2, evaluation component 202 can evaluate algorithms A1 and/or A2 to identify defined run criteria corresponding to A1 and/or A2. As described above with reference to FIG. 2, evaluation component 202 can further evaluate one or more features (e.g., attributes, parameters, etc.) of one or more quantum platforms such as, for instance, quantum platforms (a) and (b) (denoted as QP (a) and QP (b) in FIG. 5).

As described above with reference to FIG. 1 and as illustrated in FIG. 5, determination component 110 can select quantum platform (a) to run algorithm A1 and/or can further select quantum platform (b) to run algorithm A2.

As described above with reference to FIG. 3 and as illustrated in FIG. 5, based on such selection(s) by determination component 110, control component 302 can manage execution of algorithm A1 and A2 by quantum platform (a) and (b), respectively, and/or can further manage execution data (e.g., result(s), response(s), etc.) obtained from quantum platform (a) and/or (b). As described above with reference to FIG. 3 and as illustrated in FIG. 5, control component 302 can assemble (e.g., reassemble) executed algorithm A1 and/or A2 into quantum application (A) based on such execution data (e.g., execution results) obtained from quantum platform (a) and/or (b).

Based on such assembly (e.g., reassembly) by control component 302 of executed algorithm A1 and/or A2, control component 302 can further submit the reassembled quantum application to, for example, an interface component 502 (e.g., an API, a REST API, a GUI, etc.) that can be employed to interface with a user entity (e.g., an entity implementing quantum platform routing system 102 and/or system 500). As illustrated in FIG. 5, interface component 502 can provide a final result 504 of executed algorithm A1 and/or A2 and/or executed quantum application (A) to such a user entity (e.g., via rendering final result 504 on a computer monitor, display, screen, etc.).

Quantum platform routing system 102 can be associated with various technologies. For example, quantum platform routing system 102 can be associated with computing job routing technologies, quantum computing job routing technologies, quantum computation technologies, distributed quantum computation technologies, quantum computer technologies, quantum hardware and/or software technologies, quantum simulator technologies, machine learning technologies, artificial intelligence technologies, cloud computing technologies, and/or other technologies.

Quantum platform routing system 102 can provide technical improvements to systems, devices, components, operational steps, and/or processing steps associated with the various technologies identified above. For example, quantum platform routing system 102 can identify one or more components of a quantum application and/or select at least one quantum platform to execute the one or more components of the quantum application based on a defined run criterion that can comprise one or more defined run criteria of the one or more components and/or the at least one quantum platform. In this example, quantum platform routing system 102 can therefore provide a "hybrid" set of quantum hardware and quantum software based on one or more defined run criteria corresponding to the one or more components of the quantum application being executed and one or more features of differing quantum platforms (e.g., quantum systems), thereby facilitating defined execution results of the one or more components. In this example, quantum platform routing system 102 can therefore enable routing the one or more components the quantum application to one or more quantum platforms comprising quantum hardware and/or quantum software best suited and/or most applicable to execute each component(s) based on the one or more defined run criteria of the one or more components and the features of the quantum platform, thereby facilitating defined execution results (e.g., greater accuracy over shorter execution time) of the one or more components.

Quantum platform routing system 102 can provide technical improvements to a processing unit (e.g., processor 106) associated with a classical computing device and/or a quantum computing device (e.g., a quantum processor, quantum hardware, superconducting circuit, etc.) associated with quantum platform routing system 102. For example, by facilitating such defined execution results (e.g., greater accuracy over shorter execution time) of the one or more components of the quantum application as described above, quantum platform routing system 102 can thereby reduce the number of processing cycles a processing unit executing such one or more components must complete before achieving such defined execution results. For instance, by facilitating such defined execution results (e.g., greater accuracy over shorter execution time) of the one or more components of the quantum application as described above, quantum platform routing system 102 can thereby reduce the number of processing cycles and/or computation costs of a processing unit (e.g., a quantum processor) associated with the quantum platform selected by quantum platform routing system 102 to execute such one or more components.

Quantum platform routing system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Quantum platform routing system 102 and/or components thereof, can be employed to solve new problems that arise through advancements in technologies mentioned above, employment of quantum computing systems, cloud computing systems, computer architecture, and/or another technology.

It is to be appreciated that quantum platform routing system 102 can utilize various combinations of electrical components, mechanical components, and circuitry that cannot be replicated in the mind of a human or performed by a human, as the various operations that can be executed by quantum platform routing system 102 and/or components thereof as described herein are operations that are greater than the capability of a human mind. For instance, the amount of data processed, the speed of processing such data, or the types of data processed by quantum platform routing system 102 over a certain period of time can be greater, faster, or different than the amount, speed, or data type that can be processed by a human mind over the same period of time.

According to several embodiments, quantum platform routing system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that quantum platform routing system 102 can include information that is impossible to obtain manually by an entity, such as a human user. For example, the type, amount, and/or variety of information included in quantum platform routing system 102, dissection component 108, determination component 110, evaluation component 202, control component 302, and/or monitor component 402 can be more complex than information obtained manually by a human user.

Figure 6:
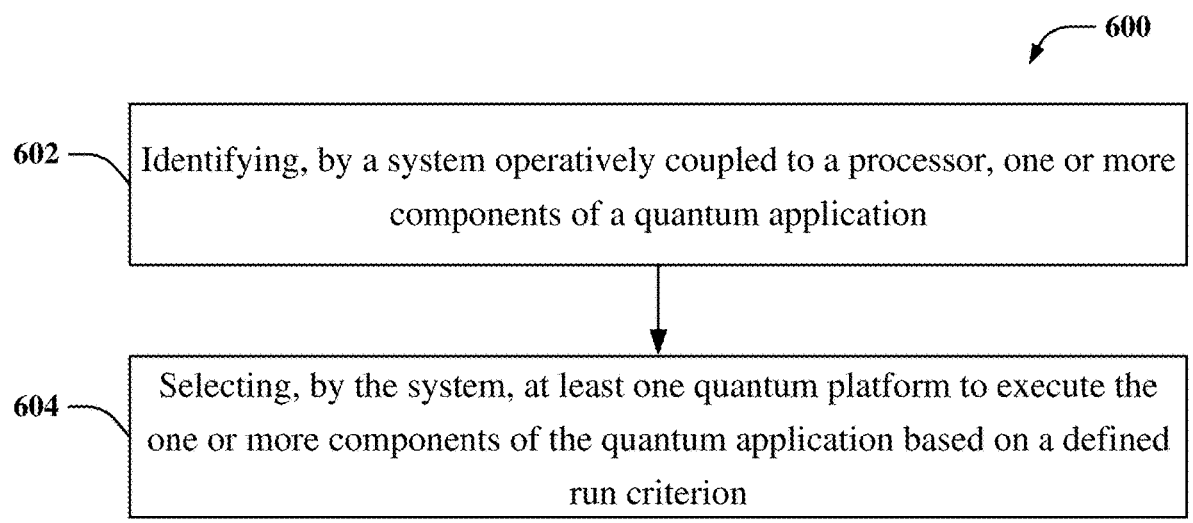
FIG. 6 illustrates a flow diagram of an example, non-limiting computer-implemented method that can facilitate quantum platform routing of a quantum application component in accordance with one or more embodiments described herein.

FIG. 6 illustrates a flow diagram of an example, non-limiting computer-implemented method 600 that can facilitate quantum platform routing of a quantum application component in accordance with one or more embodiments described herein. Repetitive description of like elements and/or processes employed in respective embodiments is omitted for sake of brevity.

At 602, computer-implemented method 600 can comprise identifying, by a system (e.g., via quantum platform routing system 102 and/or dissection component 108) operatively coupled to a processor (e.g., processor 106, a quantum processor, etc.), one or more components (e.g., algorithm A1 and/or A2 illustrated in FIG. 5) of a quantum application (e.g., quantum application (A) illustrated in FIG. 5).

At 604, computer-implemented method 600 can comprise selecting, by the system (e.g., via quantum platform routing system 102 and/or determination component 110), at least one quantum platform (e.g., quantum platform (a) and/or (b) illustrated in FIG. 5) to execute the one or more components of the quantum application based on a defined run criterion (e.g., defined run criterion described above with reference to FIGS. 1 and 2).

Figure 7:
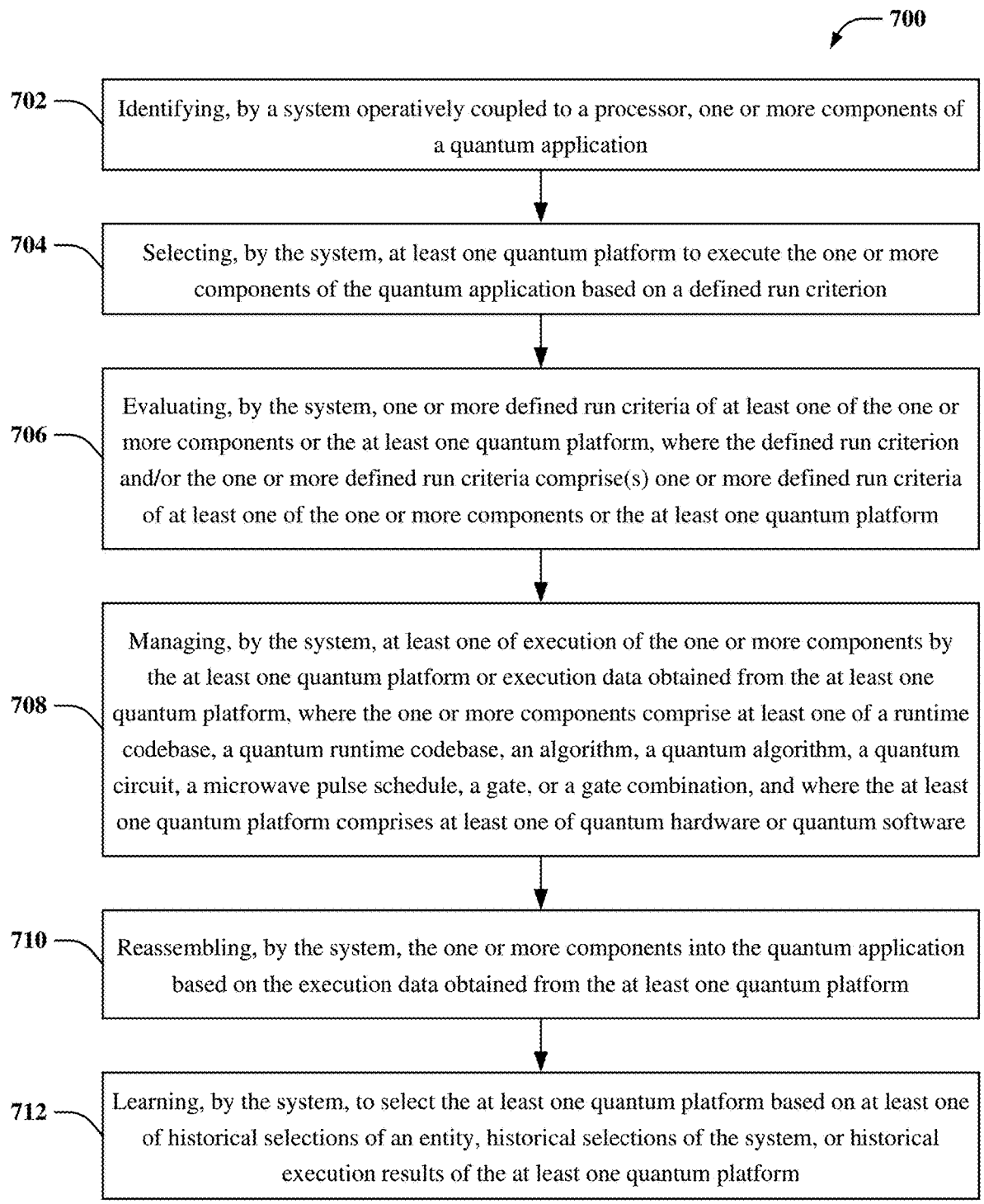
FIG. 7 illustrates a flow diagram of an example, non-limiting computer-implemented method that can facilitate quantum platform routing of a quantum application component in accordance with one or more embodiments described herein.

FIG. 7 illustrates a flow diagram of an example, non-limiting computer-implemented method 700 that can facilitate quantum platform routing of a quantum application component in accordance with one or more embodiments described herein. Repetitive description of like elements and/or processes employed in respective embodiments is omitted for sake of brevity.

At 702, computer-implemented method 700 can comprise identifying, by a system (e.g., via quantum platform routing system 102 and/or dissection component 108) operatively coupled to a processor (e.g., processor 106, a quantum processor, etc.), one or more components (e.g., algorithm A1 and/or A2 illustrated in FIG. 5) of a quantum application (e.g., quantum application (A) illustrated in FIG. 5).

At 704, computer-implemented method 700 can comprise selecting, by the system (e.g., via quantum platform routing system 102 and/or determination component 110), at least one quantum platform (e.g., quantum platform (a) and/or (b) illustrated in FIG. 5) to execute the one or more components of the quantum application based on a defined run criterion (e.g., defined run criterion described above with reference to FIGS. 1 and 2).

At 706, computer-implemented method 700 can comprise evaluating, by the system (e.g., via quantum platform routing system 102 and/or evaluation component 202), one or more defined run criteria of at least one of the one or more components or the at least one quantum platform, where the defined run criterion and/or the one or more defined run criteria comprise(s) one or more defined run criteria of at least one of the one or more components or the at least one quantum platform.

At 708, computer-implemented method 700 can comprise managing, by the system (e.g., via quantum platform routing system 102 and/or control component 302), at least one of execution of the one or more components by the at least one quantum platform or execution data (e.g., result(s), response(s), etc.) obtained from the at least one quantum platform, where the one or more components comprise at least one of a runtime codebase, a quantum runtime codebase, an algorithm, a quantum algorithm, a quantum circuit, a microwave pulse schedule, a gate, or a gate combination, and where the at least one quantum platform comprises at least one of quantum hardware or quantum software.

At 710, computer-implemented method 700 can comprise reassembling, by the system (e.g., via quantum platform routing system 102 and/or control component 302), the one or more components into the quantum application based the execution data obtained from the at least one quantum platform.

At 712, computer-implemented method 700 can comprise learning, by the system (e.g., via quantum platform routing system 102, determination component 110, and/or monitor component 402), to select the at least one quantum platform based on at least one of historical selections of an entity, historical selections of the system, or historical execution results of the at least one quantum platform.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
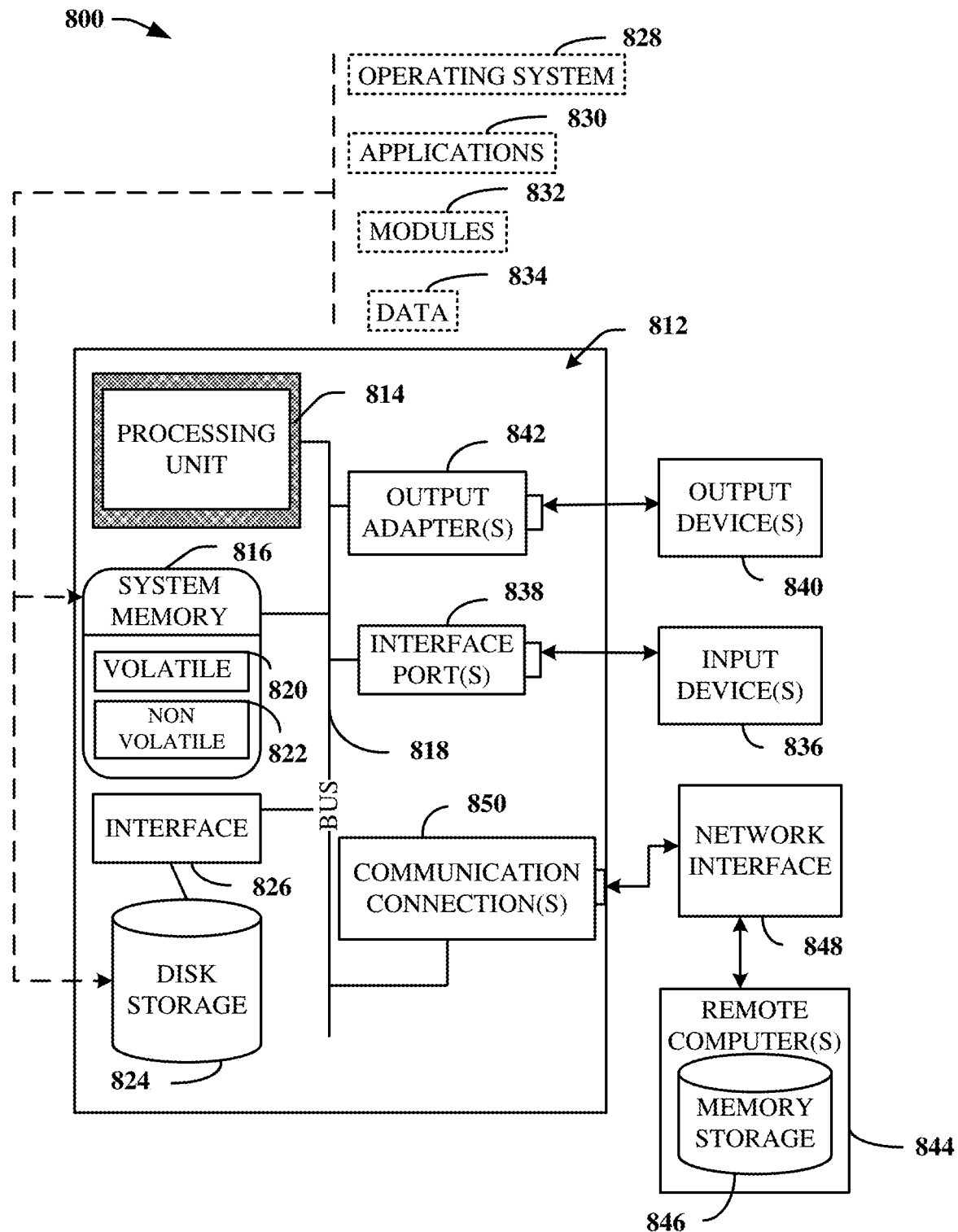
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
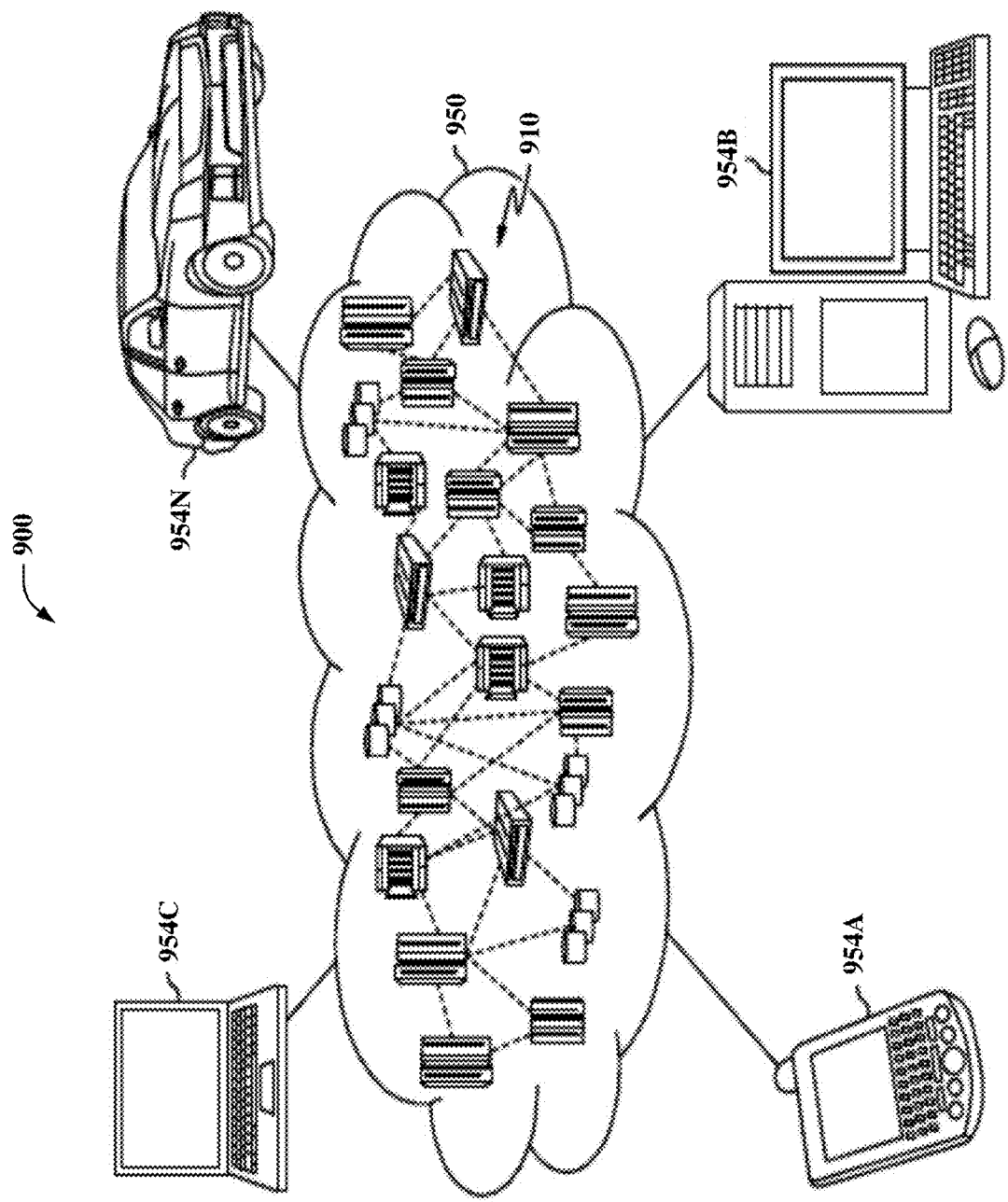
FIG. 9 illustrates a block diagram of an example, non-limiting cloud computing environment in accordance with one or more embodiments of the subject disclosure.

Referring now to FIG. 9, block diagram 900 depicts an illustrative cloud computing environment 950. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
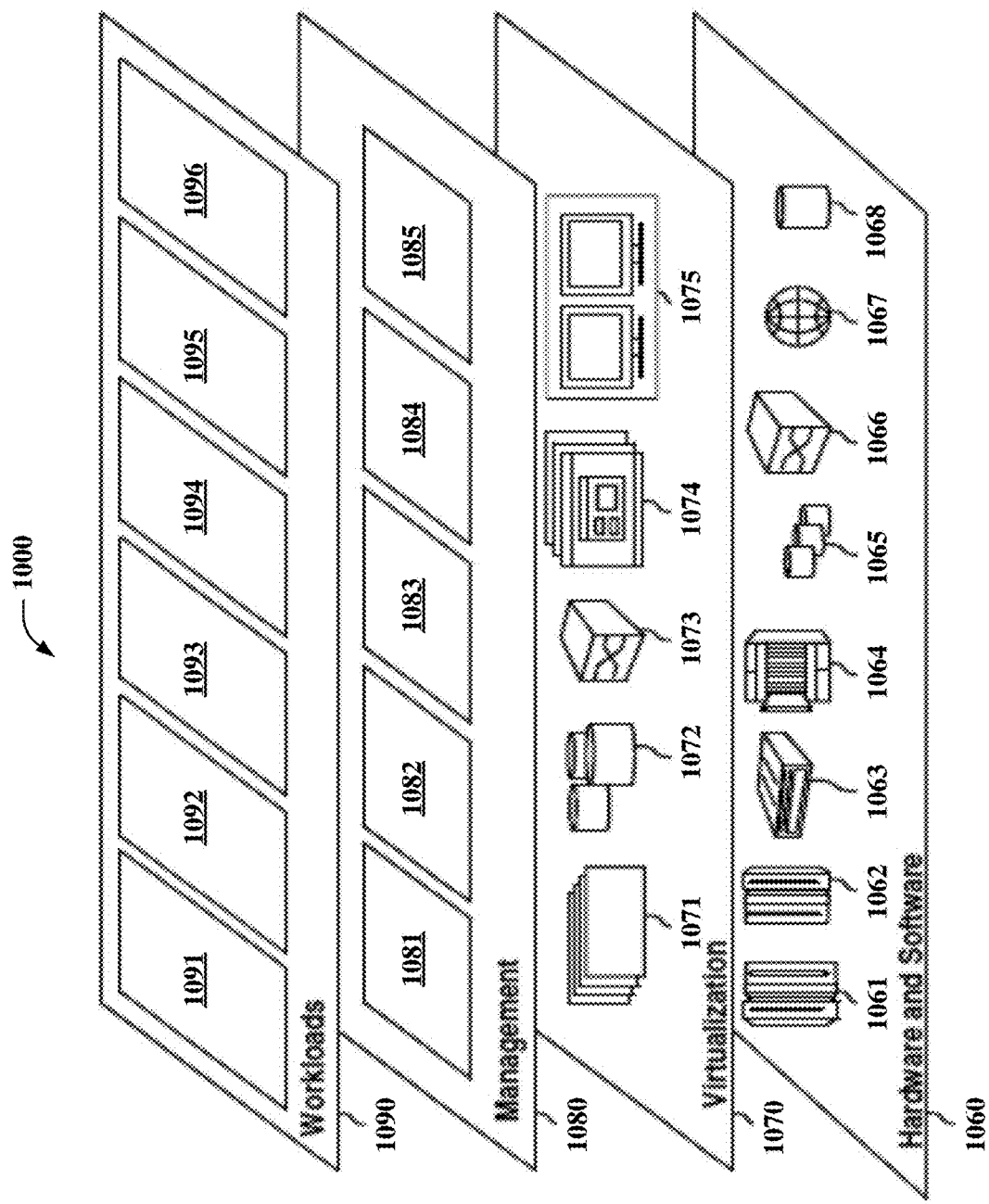
FIG. 10 illustrates a block diagram of example, non-limiting abstraction model layers in accordance with one or more embodiments of the subject disclosure.

Referring now to FIG. 10, diagram 1000 depicts a set of functional abstraction layers provided by cloud computing environment 950 (FIG. 9). It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, quantum platform routing software 1068, and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum adaptive compilation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      a dissection component that identifies one or more components of a quantum application;
      a determination component that selects at least one quantum platform to execute the one or more components of the quantum application based on a defined run criterion; and
      a control component that reassembles the one or more components into the quantum application based on execution data obtained from the at least one quantum platform.

2. The system of claim 1, wherein the defined run criterion comprises one or more defined run criteria of at least one of the one or more components or the at least one quantum platform, thereby facilitating defined execution results of the one or more components.

3. The system of claim 1, wherein the computer executable components further comprise:
   an evaluation component that evaluates one or more defined run criteria of at least one of the one or more components or the at least one quantum platform.

4. The system of claim 1, wherein the
   control component also manages at least one of execution of the one or more components by the at least one quantum platform or execution data obtained from the at least one quantum platform.

5. The system of claim 1, wherein the determination component learns to select the at least one quantum platform based on at least one of historical selections of an entity, historical selections of the determination component, or historical execution results of the at least one quantum platform.

6. The system of claim 1, wherein the one or more components comprise at least one of a runtime codebase, a quantum runtime codebase, an algorithm, a quantum algorithm, a quantum circuit, a microwave pulse schedule, a gate, or a gate combination, and wherein the at least one quantum platform comprises at least one of quantum hardware or quantum software.

7. A computer-implemented method, comprising:
   identifying, by a system operatively coupled to a processor, one or more components of a quantum application;
   selecting, by the system, at least one quantum platform to execute the one or more components of the quantum application based on a defined run criterion; and
   reassembling, by the system, the one or more components into the quantum application based on execution data obtained from the at least one quantum platform.

8. The computer-implemented method of claim 7, wherein the defined run criterion comprises one or more defined run criteria of at least one of the one or more components or the at least one quantum platform, thereby facilitating defined execution results of the one or more components.

9. The computer-implemented method of claim 7, further comprising:
evaluating, by the system, one or more defined run criteria of at least one of the one or more components or the at least one quantum platform.

10. The computer-implemented method of claim 7, further comprising:
managing, by the system, at least one of execution of the one or more components by the at least one quantum platform or execution data obtained from the at least one quantum platform.

11. The computer-implemented method of claim 7, further comprising:
learning, by the system, to select the at least one quantum platform based on at least one of historical selections of an entity, historical selections of the system, or historical execution results of the at least one quantum platform.

12. The computer-implemented method of claim 7, wherein the one or more components comprise at least one of a runtime codebase, a quantum runtime codebase, an algorithm, a quantum algorithm, a quantum circuit, a microwave pulse schedule, a gate, or a gate combination, and wherein the at least one quantum platform comprises at least one of quantum hardware or quantum software.

13. A computer program product facilitating a quantum platform routing of a quantum application component process, the computer program product comprising a computer readable storage medium having program instructions embodied therewith, the program instructions executable by a processor to cause the processor to:
identify, by the processor, one or more components of a quantum application;
select, by the processor, at least one quantum platform to execute the one or more components of the quantum application based on a defined run criterion; and
reassemble, by the processor, the one or more components into the quantum application based on execution data obtained from the at least one quantum platform.

14. The computer program product of claim 13, wherein:
the defined run criterion comprises one or more defined run criteria of at least one of the one or more components or the at least one quantum platform;
the one or more components comprise at least one of a runtime codebase, a quantum runtime codebase, an algorithm, a quantum algorithm, a quantum circuit, a microwave pulse schedule, a gate, or a gate combination; and
the at least one quantum platform comprises at least one of quantum hardware or quantum software.

15. The computer program product of claim 13, wherein the program instructions are further executable by the processor to cause the processor to:
evaluate, by the processor, one or more defined run criteria of at least one of the one or more components or the at least one quantum platform.

16. The computer program product of claim 13, wherein the program instructions are further executable by the processor to cause the processor to:
manage, by the processor, at least one of execution of the one or more components by the at least one quantum platform or execution data obtained from the at least one quantum platform.

17. The computer program product of claim 13, wherein the program instructions are further executable by the processor to cause the processor to:
learn, by the processor, to select the at least one quantum platform based on at least one of historical selections of an entity, historical selections of the processor, or historical execution results of the at least one quantum platform.

* * * * *